US012549900B2

(12) United States Patent
Dyreby

(10) Patent No.: US 12,549,900 B2
(45) Date of Patent: Feb. 10, 2026

(54) LOUDSPEAKER TRANSDUCER ARRANGEMENT

(71) Applicant: Bang & Olufsen A/S, Struer (DK)

(72) Inventor: Jakob Dyreby, Struer (DK)

(73) Assignee: Bang & Olufsen A/S, Struer (DK)

( * ) Notice: Subject to any disclaimer, the term of this patent is extended or adjusted under 35 U.S.C. 154(b) by 191 days.

(21) Appl. No.: 18/237,452

(22) Filed: Aug. 24, 2023

(65) Prior Publication Data

US 2024/0073606 A1 Feb. 29, 2024

(30) Foreign Application Priority Data

Aug. 26, 2022 (EP) .................................... 22192283

(51) Int. Cl.
*H04R 5/02* (2006.01)

(52) U.S. Cl.
CPC ......... *H04R 5/02* (2013.01); *H04R 2205/024* (2013.01)

(58) Field of Classification Search
CPC .......................... H01C 1/024; H01H 2239/048
See application file for complete search history.

(56) References Cited

U.S. PATENT DOCUMENTS 5,553,149 A * 9/1996 Freadman ................ H04R 5/02 381/306
2008/0144873 A1 6/2008 Grant et al.
2014/0177883 A1* 6/2014 Syed ........................ H04R 5/02 381/307
2020/0084538 A1 3/2020 Brown et al.
2021/0014586 A1* 1/2021 Allison ................ H04R 1/2888
2023/0319478 A1* 10/2023 Starobin ................ H04S 3/008 381/300

FOREIGN PATENT DOCUMENTS

CN 101627640 B * 8/2013 ............. H04R 1/403
CN 207947896 U * 10/2018
CN 208724178 U * 4/2019
CN 214045989 U * 8/2021
JP 2009125245 A * 6/2009
WO 2014/036085 A1 3/2014
WO WO-2015187714 A1 * 12/2015 ............. H04S 7/308
WO 2017/030914 A1 2/2017
WO WO-2021047993 A1 * 3/2021 ............. H04R 1/345

OTHER PUBLICATIONS

European Search Report for Application No. 22192283.4 issued Feb. 1, 2023.

* cited by examiner

*Primary Examiner* — Duc Nguyen
(74) *Attorney, Agent, or Firm* — Schmeiser, Olsen & Watts, LLP

(57) ABSTRACT

A loudspeaker transducer arrangement is provided. At least three loudspeaker transducer units emit sound in different directions, where the loudspeaker transducer units are arranged in separate walls, arranged in separate planes, such that a first wall arranged in the first plane is defined by a normal L1 perpendicular to the first plane and the first loudspeaker transducer unit mainly emits sound along the normal L1, a second wall arranged in the second plane is defined by a normal L2 perpendicular to the second plane and the second loudspeaker transducer unit emits sound mainly along the normal L2, and a third wall arranged in the third plane is defined by a normal L3 perpendicular to the third plane and the third loudspeaker transducer unit emits sound mainly along the normal L3. A soundbar is also provided.

15 Claims, 8 Drawing Sheets

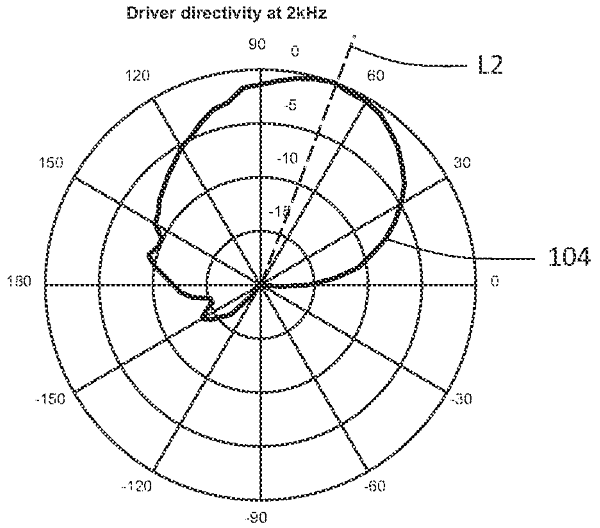
Fig. 5
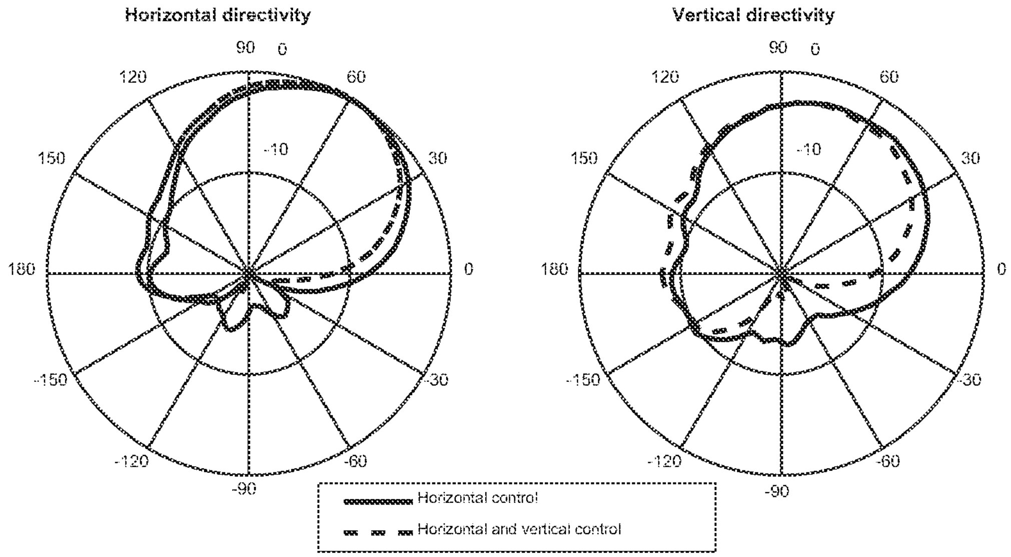
Fig. 6A
Fig. 6B

LOUDSPEAKER TRANSDUCER ARRANGEMENT

CROSS-REFERENCE TO RELATED APPLICATIONS

This application claims priority to EP Application No. 22192283.4, having a filing date of Aug. 26, 2022, the entire contents of which are hereby incorporated by reference.

FIELD OF TECHNOLOGY

The following is related to a loudspeaker transducer arrangement comprising at least three loudspeaker transducer units arranged in a geometrical configuration where at least three loudspeaker transducer units are arranged in separate planes. Furthermore, the following is related to a soundbar provided with such a loudspeaker transducer arrangement in either or both ends of the soundbar.

BACKGROUND

The arrangement of the loudspeaker transducer units together with a signal processing unit which controls the sound emission (directivity) of the combined loudspeaker transducer units foresees that the loudspeaker transducer arrangement as well as the soundbar results in radiation of sound which is optimized in three dimensions.

In the conventional art, various attempts have been presented in order to create a three-dimensional sound, but all these systems require a large number of loudspeakers and often also dedicated listening spaces in order for them to function. An example of such a system is the Dolby Atmos system where the 3D sound experience relies on loudspeakers positioned at the correct positions relative to the listener's position. Naturally, this requires that the system is installed in a designated listening space and often requires substantial interaction with the surrounding constructions such as for example the ceiling and wall construction.

SUMMARY

An aspect relates to a loudspeaker transducer arrangement where a very limited number of loudspeaker transducer units arranged in a certain geometrical configuration will create a substantially nature true 3D sound experience for a listener without substantially interfering with the surroundings. When such a loudspeaker transducer arrangement is integrated in a soundbar, for example together with other loudspeaker transducer units such as particularly low-range loudspeaker transducer units, a soundbar comprising a loudspeaker transducer arrangement in either or both ends of the soundbar together with the signal processing which is also part of embodiments of the invention, will provide the listener with a 3D sound experience.

Embodiments of the present invention are also directed to a soundbar. A soundbar is an audio unit comprising various components, typically a number of different loudspeaker transducer units, control electronics, amplifiers, various wireless or wired connections for transmitting and/or receiving signals etc. Soundbars may be used as stand-alone audio installations, where a user for example by another electronic device streams music to the soundbar for reproduction. The soundbar may also be used as an audio component in connection with a screen, such that the screen and the soundbar together constitutes an audio-video unit.

Embodiments of the underlying inventive concept may be described as how to obtain a three-dimensional sound experience for a listener, using a very limited number of loudspeaker transducer units, arranged in a single housing (the soundbar). Furthermore, the aim is to be able to play sound relatively loud without sound distortion and diminishing of the three-dimensional experience.

Embodiments of the invention provide a loudspeaker transducer arrangement comprising at least three loudspeaker transducer units emitting sound in different directions, where the loudspeaker transducer units are arranged in separate walls, where the walls are arranged in separate planes, wherein first, second and third planes are arranged relative to a three-dimensional cartesian coordinate system comprising x, y and z-axes, such that

- a first wall arranged in the first plane is defined by a normal L1 perpendicular to the first plane and which normal L1 is parallel with the x-axis and the first loudspeaker transducer unit mainly emits sound along the normal L1, where
- a second wall arranged in the second plane is defined by a normal L2 perpendicular to the second plane and which normal L2 results from rotating an axis parallel with the y-axis by an angle θ between 0 and 40 degrees around the z-axis (in the x-y plane) in the direction of the positive x-axis, and the second loudspeaker transducer unit emits sound mainly along the normal L2, and where
- a third wall arranged in the third plane is defined by a normal L3 perpendicular to the third plane and which normal L3 results from rotating an axis parallel with the z-axis by an angle φ between 0 and 20 degrees around the y-axis (in the x-z plane) in the direction of the positive x-axis and subsequently rotating the axis by an angle ρ between −20 and 20 degrees around the x-axis in the direction of the negative y-axis, and the third loudspeaker transducer unit emits sound mainly along the normal L3.

In broad terms the loudspeaker transducer unit in the first wall will be directed generally/mainly in the direction of a listening position whereas the loudspeaker transducer units in the second and third walls will be aimed at a sidewall (side-firing) and the ceiling (up-firing) respectively of the room in which the loudspeaker transducer arrangement is provided.

Above reference is made to a cartesian coordinate system. Particularly the term "in the direction of the positive x-axis", shall be understood in the conventional manner. Where the three axes (x,y,z) intersect is defined a common "0". From here the axes extend in a positive half space and a negative half space. Therefore, the direction of the positive x-axis is the direction of the x-axis into the positive half space.

Likewise, the use of the term "mainly" is relevant when defining a direction in which sound is emitted from a loudspeaker, as sound emitted from a loudspeaker will normally not be concentrated in one direction only but will spread out. This is known as the loudspeaker units' directivity, as will be further discussed below.

In embodiments, the second loudspeaker transducer unit will not be emitting sound perpendicularly at a sidewall, but at a slight angle such that the sound will be reflected off the sidewall towards the listening position. The same is true for the third loudspeaker transducer unit which will be aimed at the ceiling, for example also at an angle such that the sound will be reflected off the ceiling towards the listening position in embodiments. As the sound emitted from the loudspeaker transducer unit is not limited to a very narrow direction, meaning that the sound does not only propagate in one single direction, but due to the nature of the loudspeaker transducer units there will be a certain spread of the sound, consequently the sound perceived at the listening position will come from the side, and not from a distinct point. However, the main part of the sound will be emitted generally in a direction orthogonal to the plane of the loudspeaker transducer unit which in this case is also the plane of the wall in which the loudspeaker transducer unit is mounted. The spread is called directivity and by arranging the loudspeaker transducer units in such a way that they emit sound along the normal (L1, L2 and L3) as suggested in the embodiment described above, the sound reflected off a sidewall/ceiling from a loudspeaker transducer unit, for example in the second wall will arrive at the listening position after having been reflected off the sidewall.

This 3D listening experience is furthermore enhanced by the signal processing unit which will divide and distribute the sound signal to the relevant loudspeaker transducer units such that sounds in reality occurring for example above the listener's position will be emphasized and by the signal processing unit sent to the third loudspeaker transducer unit which is directed for sound emission directed upwards and therefore will be reflected off the ceiling before arriving at the listener's position. The directivity of a loudspeaker is highly frequency dependent. The higher frequency which is emitted the more concentrated sound emission. At lower frequencies (bass for example) the sound will be distributed almost in any direction, thereby having a very wide directivity. Directivity is an indication of how directional the loudspeaker is, or to look at it another way, how effective the speaker is at taking the sound it produces and sending it in one particular direction instead of all directions. In that manner a sound which in reality occurs above the listener's position will, due to the signal processing and the splitting of the sound signal to designated loudspeaker transducer units also arrive at a listening position as being emitted from upwards due to the reflection off the ceiling.

Due to the nature of loudspeakers the possibilities for manipulation of the individual loudspeaker transducer units' directivities by the signal processing unit are very limited. An object with embodiments of the present invention, is to create a full three-dimensional sound experience for a listener, however using only very few loudspeaker transducer units.

In a further embodiment the first, second and third loudspeaker transducer units emit sound at different angles away from the z-y plane into the half space defined by the positive x-axis. Initially it is to be understood that all loudspeaker transducer units emit sound in a direction such that when the sound is reflected by sidewalls or the ceiling, the sound is directed toward a listener positioned generally in front of the loudspeaker arrangement. In this embodiment it is therefore contemplated that the loudspeaker transducer units are directed in a direction away from the z-y plane towards the listener, and not away from a listener. In other embodiments it may be contemplated that further loudspeaker transducer units are directed in opposite directions in order to reflect off other surfaces such as for example a rear wall, the floor etc.

In a further embodiment, a fourth wall is provided in a fourth plane, the fourth wall intersecting the second and third walls, optionally with one or more loudspeaker transducer units arranged in the fourth wall.

By providing the fourth wall intersecting the second and third walls the sound emitted from the second and third loudspeaker transducer units will, due to the directivity and the spreading of sound caused by the loudspeaker transducer unit as such reflect the sound off the fourth wall towards both the listener, the ceiling and a sidewall. Furthermore, the fourth wall will reduce the sound emitted towards a back wall. In this manner a more concentrated radiation of sound towards the desired directions is achieved.

The loudspeaker transducer units may be of the same type and size or they may be selected with different characteristics. Loudspeaker units of the same type shall be understood as for example loudspeaker transducer units comprising an electromagnetic driver agitating a cone shaped membrane, but not limited to this type. All types of suitable loudspeaker units may be implemented.

In a further embodiment of the invention the first, second and third loudspeaker transducer units are arranged in separate acoustic volumes. The separate acoustic volumes diminish or altogether avoid that the various sound transducer units interfere with each other or influence each other which may be detrimental to the overall sound reproduction.

This is even more so with the geometric pattern in which the loudspeaker transducer units are arranged in embodiments of the present invention, in that reflections from the housing in which they are mounted, such as for example a soundbar, will have influence on their directivity and as such influence the reflective pattern of the sound transmitted to a listener.

In a still further embodiment two or more loudspeaker transducer units are arranged in the first wall and/or the second wall and/or the third wall.

Although one of the aspects of embodiments of the present invention is to have a very limited number of loudspeaker transducer units arranged in a particular geometric relative relationship in combination with a signal processing which in combination creates the desired 3D sound effects it is also possible that for large installations additional loudspeaker transducer units may be arranged in the walls, for example in order to emphasize the direct radiation of sound towards the listening position.

Also, in embodiments where the loudspeaker transducer units cover limited wavelength intervals, arranging supplementary loudspeaker transducer units complementing the spectrum of wavelengths may be desirable in order to get a spacious sound image.

Embodiments of the invention are also directed to a soundbar where the loudspeaker transducer arrangement discussed above is integrated in both sides of the soundbar. Therefore, embodiments of the invention are also directed to a soundbar for emitting a three dimensional sound image to a listener in a room, the room having a floor, a ceiling, and two sidewalls, where the listener is positioned in front of the soundbar, the soundbar having a height, width and a depth, where the width is substantially larger than the height and depth, and a longitudinal axis is arranged in the width direction, the longitudinal axis being parallel to a y-axis, and where the x-z plane orthogonal to the y-axis is arranged such that the soundbar has plane symmetry on either side of the x-z plane where the soundbar in either side comprises a loudspeaker transducer arrangement, and where sound emission of each loudspeaker transducer is controlled by digital signal processing.

It will be understood that in embodiments the geometrical arrangements of the loudspeaker transducer units in the arrangement discussed above are arranged as mirror images of each other (a loudspeaker transducer arrangement in both ends of the soundbar) in the soundbar such that the soundbar will radiate sound from either side of the soundbar which sound is then reflected from adjacent surfaces (walls, ceiling, floor and the like) towards the listener, who should be positioned substantially in front of the soundbar installation. Consequently, the soundbar including the loudspeaker transducer arrangement, and the signal processing as discussed above make it possible to control the directivity of the loudspeaker in three dimensions with only a very limited number of loudspeaker transducer units. The geometrical relative position and direction of the loudspeaker transducer units arranged in the various planes discussed above yield the possible radiation of the sound at higher frequencies. Physically, sounds in the low frequency band will radiate substantially concentrically from the source and as such do not require the same attention to directing the loudspeaker towards the listening position whereas the higher the frequency the more pronounced the directivity and as such with embodiments of the inventive arrangement of the loudspeaker transducer unit as described above the yield of the radiation at higher frequencies is optimized. The resulting radiation is optimized in three dimensions simultaneously to make sure that the 3D experience is enhanced. At the same time the geometrical relationship between the various walls in which the loudspeaker transducer units are arranged makes sure that side lobes are not radiated in undesirable directions. Loudspeaker directivity may be explained as the extent to which loudspeakers focus the sound into a particular direction (typically towards the listener) instead of emitting it in all directions around the room. It is usually an object to concentrate the directivity as much as possible towards the listener. The directivity (the non-focus of emitted sound) creates side lobes which is to be understood as undesired radiation from the loudspeaker—typically on the extreme sides of the directivity pattern. With embodiments of the inventive arrangement of loudspeaker transducer units as defined with embodiments of the present invention it is achieved that both a diffused and less localizable sound image is created as well as a focused and localizable sound image. This is partly achieved by minimizing the direct sound emission directly from the speaker to the listener, and maximizing the sound emitted in other directions.

Moreover, with embodiments of this inventive arrangement it is possible to play sound in multiple directions at the same time using the same drivers simply by controlling the signal processing to activate the single loudspeaker transducer units at set points. Therefore, one sound object may be sent to reflect off a ceiling while another is reflecting off a sidewall such that the listener will perceive the sound as coming from different directions. Consequently, by optimizing the soundbar as discussed above providing the loudspeaker transducer unit placement in the inventive geometrical relationship together with the active directivity control achieved by the signal processing, the soundbar (and thereby loudspeaker transducer arrangement) is developed to give the largest ratio between reflected sound level from ceiling and sidewalls and direct sound level from the first loudspeaker transducer units at the high frequencies where normally active directivity control is not feasible. Therefore, the directivity control is optimized in a three-dimensional space due to the reflection off the sidewalls and the ceilings around the loudspeaker transducer units and the entire soundbar rather than only issuing sound in a single plane.

BRIEF DESCRIPTION

Some of the embodiments will be described in detail, with references to the following Figures, wherein like designations denote like members, wherein:

FIG. 5 illustrates a driver directivity;

FIG. 6A illustrates the horizontal directivity;

FIG. 6B illustrates the vertical directivity;

DETAILED DESCRIPTION

Figure 1:
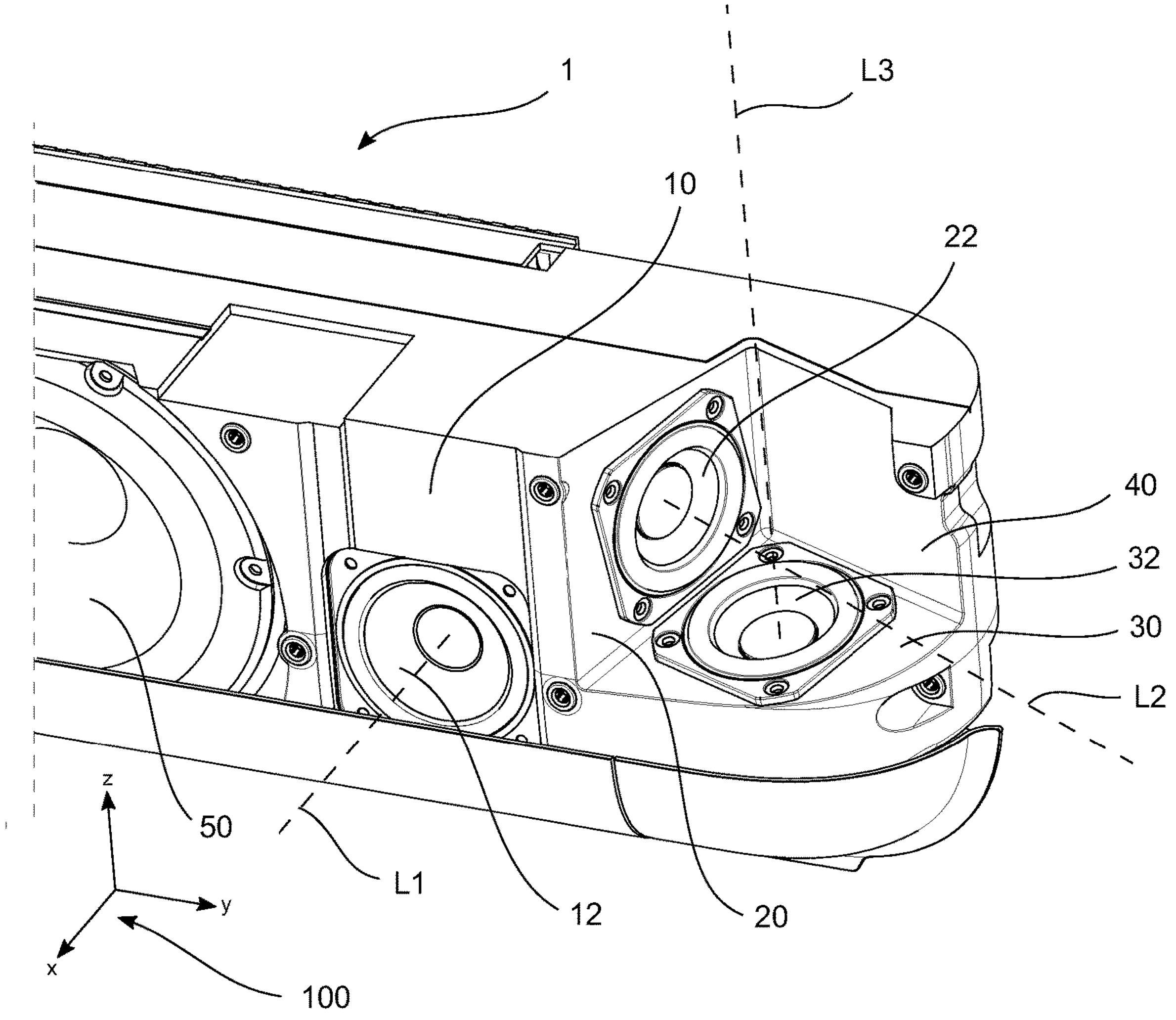
FIG. 1 illustrates schematically one end of a soundbar.

In FIG. 1, one end of soundbar 1, according to embodiments of the invention is schematically illustrated. In this embodiment of the invention a number of walls 10, 20, 30, 40 are provided in which walls separate loudspeaker transducer units 12, 22, 32, are arranged. In order to discuss the geometrical relationship, the various walls and thereby the direction in which the different loudspeaker transducer units 12, 22, 32 emit sound, a cartesian coordinate system 100 is introduced. In this manner the longitudinal direction of the soundbar 1 is arranged along the y-axis and the height of the soundbar 1 is arranged along the z-axis and the depth of the soundbar 1 is arranged along the x-axis.

Consequently, the first wall 10 is arranged in a first plane defined by the z-y plane such that the loudspeaker transducer unit 12 emits sound along a normal L1 perpendicular to the first wall 10 and the loudspeaker transducer unit 12.

Likewise, the second wall 20 is arranged in a second plane. This plane is angled slightly with respect to the z-x plane. The second wall arranged in the second plane is defined by a normal L2 perpendicular to the second plane and which normal L2 results from rotating an axis parallel with the y-axis by an angle θ between 0 and 40 degrees around the z-axis (in the x-y plane) in the direction of the positive x-axis. The second loudspeaker transducer unit 22, arranged in the second wall 20 thereby emits sound mainly along the normal L2. In the illustrated embodiment the angle θ is approximately 20 degrees.

The first wall 10 and the second wall 20 are connected.

The third wall 30 is arranged in a third plane defined by a normal L3 perpendicular to the third plane and which normal L3 results from rotating an axis parallel with the z-axis by an angle φ between 0 and 20 degrees around the y-axis (in the x-z plane) in the direction of the positive x-axis and subsequently rotating the axis by an angle ρ between 0 and 20 degrees around the x-axis in the direction of the negative y-axis. The third loudspeaker transducer unit 32 arranged in the third wall 30, thereby emits sound mainly along the normal L3. As illustrated the third wall 30 is angled both with respect to the first wall 10 and the second wall 20. In the illustrated embodiment the angle φ is approximately 8 degrees, and the angle ρ is also approximately 8 degrees.

The fourth wall 40 is connecting the second and third walls 20, 30 behind the loudspeaker transducer unit relative to the listening position such that a part of the sound emitted from the second and third loudspeaker transducer unit 22, 32 is reflected off the fourth wall 40 towards the listening position. In this manner the reflection in the negative x-direction, against a potential rear wall in the place where the soundbar 1 is arranged is reduced.

In the housing is furthermore provided one or more large loudspeaker transducer units 50 suitable for low frequencies. The loudspeaker transducer units 50 are substantially arranged in the same plane as the first loudspeaker transducer unit 12 and will emit the low frequencies omnidirectionally.

In use the loudspeaker arrangement as discussed above will emit sound in three dimensions such that the first loudspeaker transducer unit 12 will generally emit sound along the axis L1 directly towards the listening position whereas the second loudspeaker transducer unit 22 emitting sound generally along the axis L2 will aim the sound emission at a sidewall and due to reflection from the sidewall the sound emitted from the second loudspeaker transducer unit 22 will arrive at the listening position. Likewise, the third loudspeaker transducer unit 32 arranged for emitting sound along the axis L3 will emit sound which is reflected off the ceiling after which the sound will arrive at the listening position. The sound emitted in the various directions is a combination of contributions from every loudspeaker transducer unit in the setup (12, 22, and 32), such that sound emitted by e.g., the front transducer 12 (along the axis/normal L1) will contribute to the sound picture which is directed upwards and sideways from the sound bar 1 as well. The output of each transducer is calculated by optimizing the individual directivities. In this manner a 3D sound image is created by creating a balance between the different Inputs transferred to the front, side and up loudspeakers.

Figure 2:
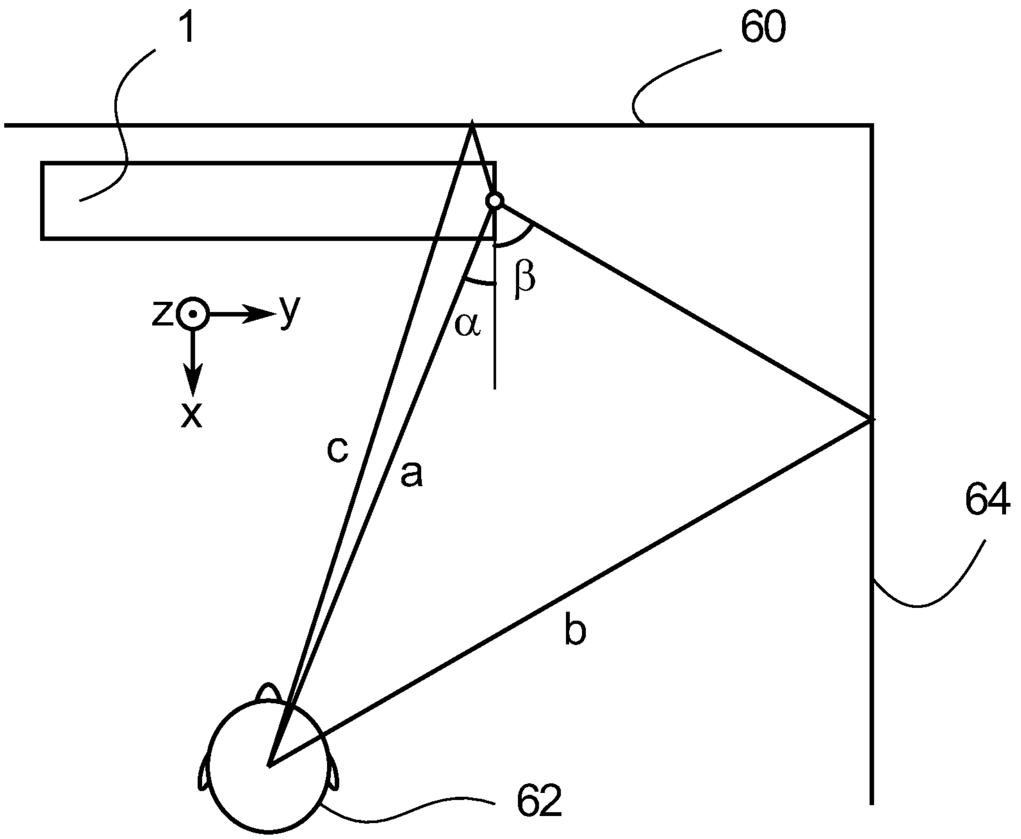
FIG. 2 illustrates a position of a listener.

With reference to FIG. 2, is illustrated the principles of how sound emitted in different directions will travel towards a listener 62. It should be noted that this example illustrates how "pure signals", meaning signals which have been split into front, side and up signals will travel towards the listener's position. As will be evident from the explanation below, embodiments of the present invention due to its signal processing unit, emits "mixed-signals", thereby creating a different sound image at the listener's position.

As sound travels at a certain speed it is necessary to process the signals delivered to each of the loudspeaker transducer units such that the sound delivered at the listening position will arrive at the same time, in order to present the intended sound image. As should be evident from FIG. 2 it is obvious that the distance travelled by sound emitted from a loudspeaker along the route a is shorter than sound having to travel along the routes b or c. The actual lengths of a, b and c depends on the angles α and β, as well as the actual distances to the surfaces off which the sound is reflected.

As an example, it may be assumed that FIG. 2 illustrates a soundbar 1, according to embodiments of the invention, mounted on a backwall 60. A listener 62 is arranged substantially in front of the soundbar. The line "a" corresponds to the axis L1 along which the first loudspeaker transducer unit 12 generally/mainly emits sound. Likewise, the sound emitted from the second loudspeaker transducer unit 22 along the axis L2 is reflected off a sidewall 64 before it arrives at the listening position.

The sound emitted along the axis/normal L3 from the third loudspeaker transducer unit 32 is bounced off a ceiling (not illustrated) such that also the travelling distance for the sound emitted from the third loudspeaker transducer unit 32 has a substantially longer distance to travel before arriving at the listener's position.

In order to compensate for these various distances, the sound has to travel, the sound is led through a directivity control signal processing unit which will delay some of the sound signals, such that the resulting sound experience at the listener's position corresponds to the intended presentation of the sound.

With embodiments of the present invention the directivity control signal processing unit, takes it steps further as the directivity control signal processing unit comprises three drivers with three directivities, where the various input signals are mixed, such that not only are the signals delayed, but they are also mixed such that an abstract 3D sound experience is perceived at the listener's position. The principle of the directivity control signal processing unit is as illustrated with reference to FIG. 3.

Figure 3:
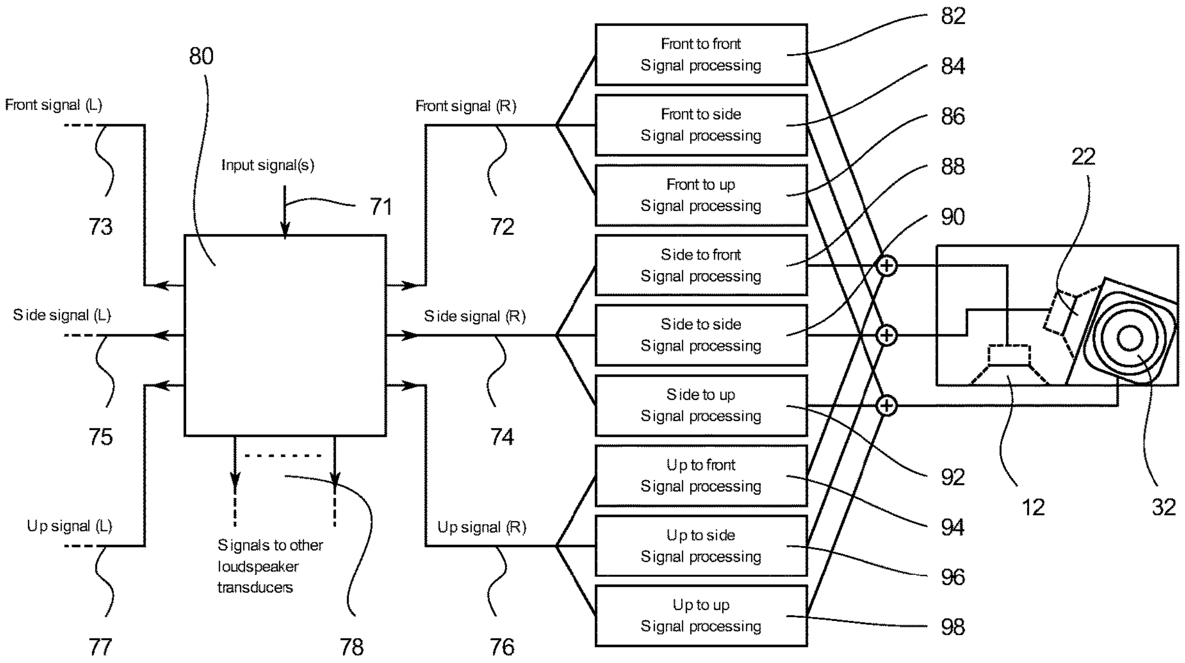
FIG. 3 illustrates a block diagram.

In FIG. 3 the right-half of a system is illustrated. In the center of the system is provided a central input sound control 80 which receives the input signal 71 and processes and splits the input signal into multiple signals. From the central input sound control 80 the signals 72,74,76 are distributed to signal processing units 82,84,86,88,90,92,94,96,98—in this embodiment arranged for a right-hand side of a soundbar, while further signals 73,75,77 are directed symmetrically to signal processing units for the left-hand side (not shown in FIG. 3). Further signals 78 are directed to other loudspeaker transducer units such as center unit(s) and bass unit(s) (not shown in FIG. 3) in the soundbar 1. Below only the right-hand side of the signal processing units will be explained. The left-hand side will distribute and process the divided signal in a comparable manner.

The sound signal is divided into a front signal 72, a side signal 74 and an up signal 76. All signals 72, 74 and 76 may be combined and filtered by the signal processing units 82,84,86,88,90,92,94,96,98 such that the sound emitted from for example the front loudspeaker 12 comprises a combined signal, where the combined signal comprises input from the "front to front", "side to front" and "up to front" signal processing units 82,88,94. Likewise, the side loudspeaker transducer unit 22 comprises input from the "front to side", "side to side" and "up to side" signal processing units 84,90,96, and the up loudspeaker transducer unit 32 comprises input from the "front to up, "side to up" and "up to up" signal processing units 86,92,98. The directivity control signal processing unit balances the input from each part signal such that the sound image at the listener's position becomes either focused or diffuse given by the way the source material was mixed in the recording studio.

So, each loudspeaker transducer unit gets signal contributions from all three signals (front 72, side 74 and up 76). Equally, each signal (front 72, side 74 and up 76) contributes to all loudspeaker transducer units 12,22,32.

For example, sound perceived as coming from the front is a combined sound signal where the forward-facing loudspeaker 12 in combination with the side and up loudspeaker transducer units 22,32, together contribute to a front sound beam.

So, for instance, the front signal 72 is fed to the "front to front", "front to side" and "front to up" signal processing units 82,84,86 and led to the appropriate loudspeaker transducer units 12, 22, 32.

The same signal processing is provided in order to treat the side signal 74 such that it is also fed to the "side to front", "side to side" and "side to up" signal processing units 88,90,92 and led to the appropriate loudspeaker transducer units 12,22,32. The same is of course true for the up signal

76 which is provided to the "up to front", "up to side" and "up to up" signal processing units 94,96,98.

This means that the desired sound directivity is realized by all three loudspeaker transducer units 12,22,32 in tandem for each of the three dimensions.

By this arrangement the resulting radiation is optimized in the three directions: front, side and up simultaneously in order to compensate for the side lobes present in the directivity such that the sound in the side lobes is not radiated in undesirable directions. The three-dimensional space to which the directivity control is optimized particularly with the signal processing units 82-98, provides the three-dimensional sound experience in the listening position 62 as illustrated in FIG. 2.

Turning to FIG. 2 it is clear that the listener 62 arranged substantially in front of the soundbar 1 will receive a substantially 3D-sound image. As the path of the direct sound along the axis a is shorter than the path of the reflections along the axes b and c, the direct sound will arrive at the listening position 62 before any of the other reflections unless these are treated with appropriate signal processing. The human auditory system will locate the first arriving wave front which means that even a low-level direct sound will cause the sound source to be perceived as arriving from the speaker driver rather than from the sidewall 64.

Therefore, an aspect of embodiments of the invention by the geometrical arrangement of the loudspeaker transducer units combined with the signal processing is to obtain localization from the reflection as a matter of minimizing the ratio between the direct sound levels and the reflected sound levels along the axes a, b and c. It is clear that the distance the sound has to travel from being emitted from the loudspeaker transducer unit until it arrives at the listener's position 62 may vary depending on the set-up, e.g., the distance from the loudspeaker transducer unit to the sidewall 64 off which the sound is reflected may vary considerably from place to place as may the listener's 62 distance to the soundbar 1. For this purpose, it is the level ratio between direct and reflected sound that determines if the sound source is located in the direction of the reflection.

Since the variability of the axis b's direction with respect to the soundbar 1, the sidewall 64 and the listener's position 62, it is more relevant to minimize the level radiated in a direction directly towards the listener as indicated by the axis a rather than maximizing the level radiated in the direction of the axis b.

Figure 4A:
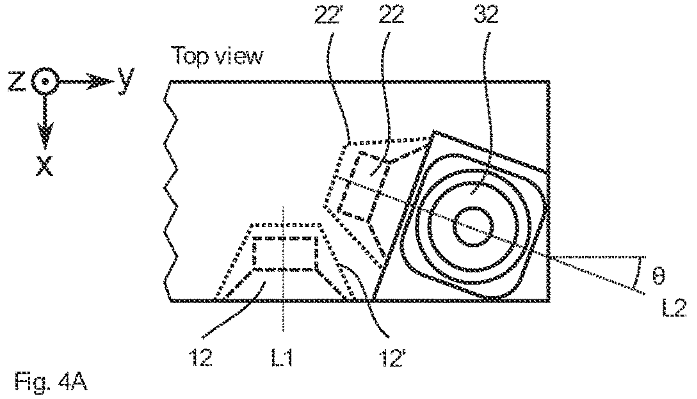
FIG. 4A illustrates a top view of the geometrical arrangement of the loudspeaker transducer units.
Figure 4B:
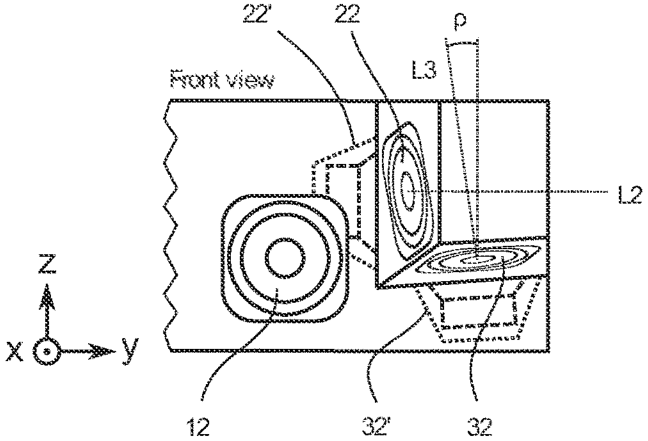
FIG. 4B illustrates a front view.
Figure 4C:
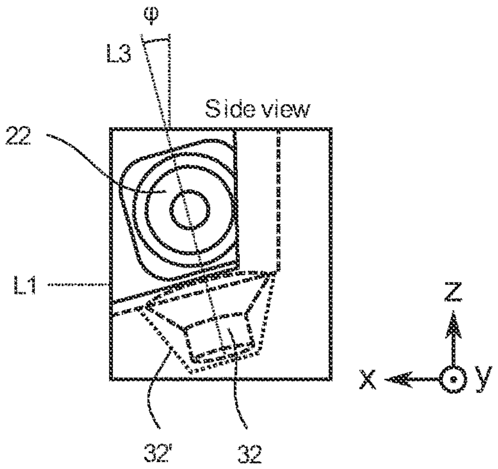
FIG. 4C illustrates a side view.

FIGS. 4A, 4B and 4C illustrate the geometrical arrangement of the loudspeaker transducer units 12, 22 and 32 seen in a top view, front view and side view respectively.

In FIG. 4A is illustrated a top view of the arrangement of the loudspeaker transducer units 12, 22 and 32 and it may be seen that the top view corresponds to a view in an x-y plane.

As indicated, the first loudspeaker transducer unit 12 emits sound generally along the axis L1 which is parallel to the x-axis, whereas the second loudspeaker transducer unit 22 arranged in the second wall 20 emits sound along the axis L2. This axis L2 is angled with respect to the y-axis with the angle θ. Finally, the third loudspeaker transducer unit 32 emits sound generally in the direction of the axis L3 which axis L3 is angled with respect to the z-axis as will be discussed below. The fourth wall 40 is provided in order to reduce side lobes from the directivity of the sound emitted along the axes L2 and L3 to maximize the level difference between reflected and direct sound. Furthermore, the fourth wall 40 also reduces the emission of sound towards a rear wall 60, and thereby also reflections from such a wall.

Turning to FIG. 4B a front view is illustrated, i.e., seen from a listener's position where the first loudspeaker transducer unit 12 emits sound in the x-direction whereas it may be seen that due to the angle of the loudspeaker transducer unit 22 in the second wall 20 the axis L2 is parallel to the y-axis, but angled with respect to the x-axis as illustrated with reference to FIG. 4A. Likewise, the third loudspeaker transducer unit 32 is directed to emit sound along the axis L3 towards the ceiling, and due to the angle, i.e., the third wall 30 is not horizontal, but angles slightly as explained above with reference to FIG. 1, the sound emitted along the axis L3 will reflect off the ceiling and thereby towards the listening position 62 as discussed with reference to FIG. 2.

Finally, in FIG. 4C a side view is illustrated where it may be seen that the second loudspeaker transducer unit 22 is aimed towards the side, whereas the third loudspeaker transducer unit 32 is emitting sound along the axis L3 which is angled with respect to the z-axis such that the reflection off the ceiling will be propagated towards the listening position 62.

Furthermore, FIGS. 4A, 4B and 4C also illustrate optional embodiments where each loudspeaker transducer unit 12,22,32 is provided with separate acoustic volumes 12',22',32'. By providing the acoustic volumes 12', 22' and 32', it is achieved that the sound emission from one loudspeaker transducer unit does not severely or dramatically interfere and influence the sound emission from an adjacent loudspeaker transducer unit.

One of the important aspects of sound emission from loudspeakers of this type is the fact that loudspeakers do not only emit sound in one direction, but emit sound in a number of directions called the directivity of the loudspeaker transducer unit. In the example of directivity illustrated in FIG. 5 a loudspeaker is positioned centrally in the diagram and the axis L along which the sound is being emitted corresponds to the axis L2 of the loudspeaker transducer unit 22 arranged in the second wall 20 directed towards a sidewall for reflection of the sound towards the listening position 62.

In this diagram it may be seen that the directivity is at its largest along the L2 axis, but due to the construction of the loudspeaker transducer unit and the settings in which it is mounted the overall directivity illustrated by the curve 104 provides a rather wide sound main lobe. The parts of the curve 104 furthest from the axis L2 are denoted side lobes and are undesirable when trying to arrange a number of loudspeakers in a system where the object is to create a 3D sound experience to a listener as described above with reference to FIGS. 2 and 3. In the diagram illustrated in FIG. 5 the x-axis is at zero whereas the y-axis is at 90 degrees. Therefore, it may be seen that the axis L2 is angled approximately 70 degrees with respect to the x-axis. In order to understand embodiments of the invention it is enough to understand that directivity of a loudspeaker transducer unit more or less will have the distribution as illustrated in FIG. 5. However, the directivity of a loudspeaker transducer unit may vary depending on the settings in which the loudspeaker is designed to emit sound.

Turning to FIGS. 6A and 6B the resulting directivities of the loudspeaker arrangement as discussed with reference to FIG. 1 are illustrated. FIG. 6A illustrates the horizontal directivity whereas FIG. 6B illustrates the vertical directivity. Generally, loudspeaker systems are primarily designed for horizontal directivity, but due to the third loudspeaker transducer unit 32 arranged in a third wall 30 of the present system there will also be a third dimension. This dimension is further enhanced by the signal processing units as described by FIG. 3 where the horizontal signals are split up such that the vertical component is treated by signal processing, e.g. the "side to up" signal processing unit indicated by reference number 92 in FIG. 3 ensures that the contribution from the side signal on the three-dimensional sound experience is also taken into account and introduced into the processing unit in order to calculate the optimum sound as perceived by the listener 62.

Figure 7:
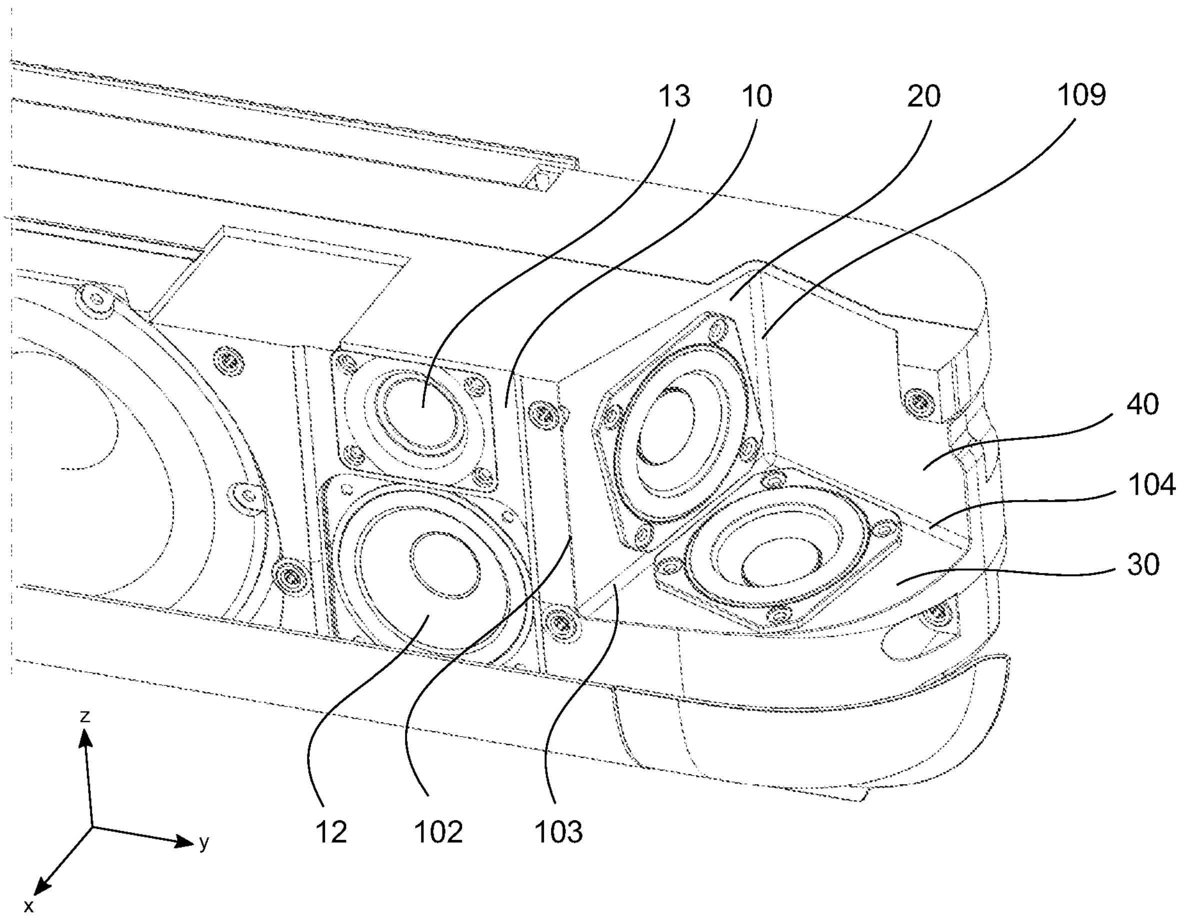
FIG. 7 illustrates an alternative arrangement for arranging the loudspeaker transducer units in the loudspeaker arrangement.
Figure 8:
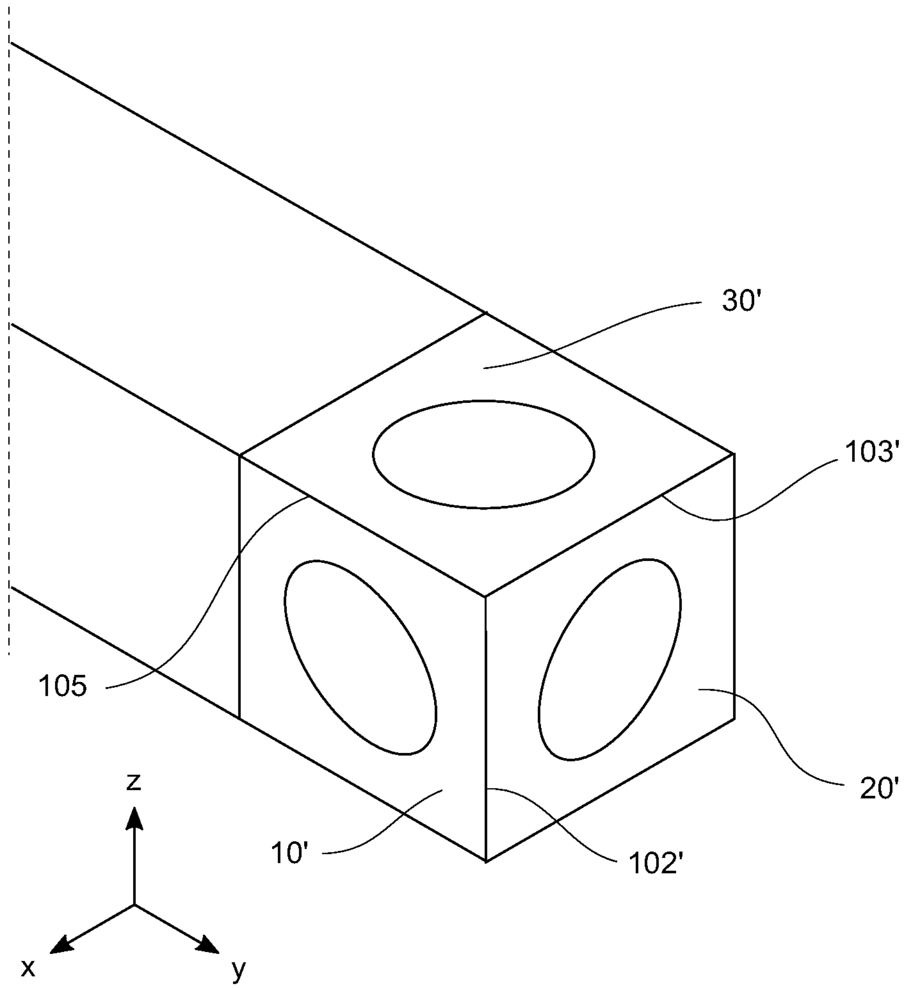
FIG. 8 illustrates another alternative arrangement for arranging the loudspeaker transducer units in the loudspeaker arrangement.
Figure 9:
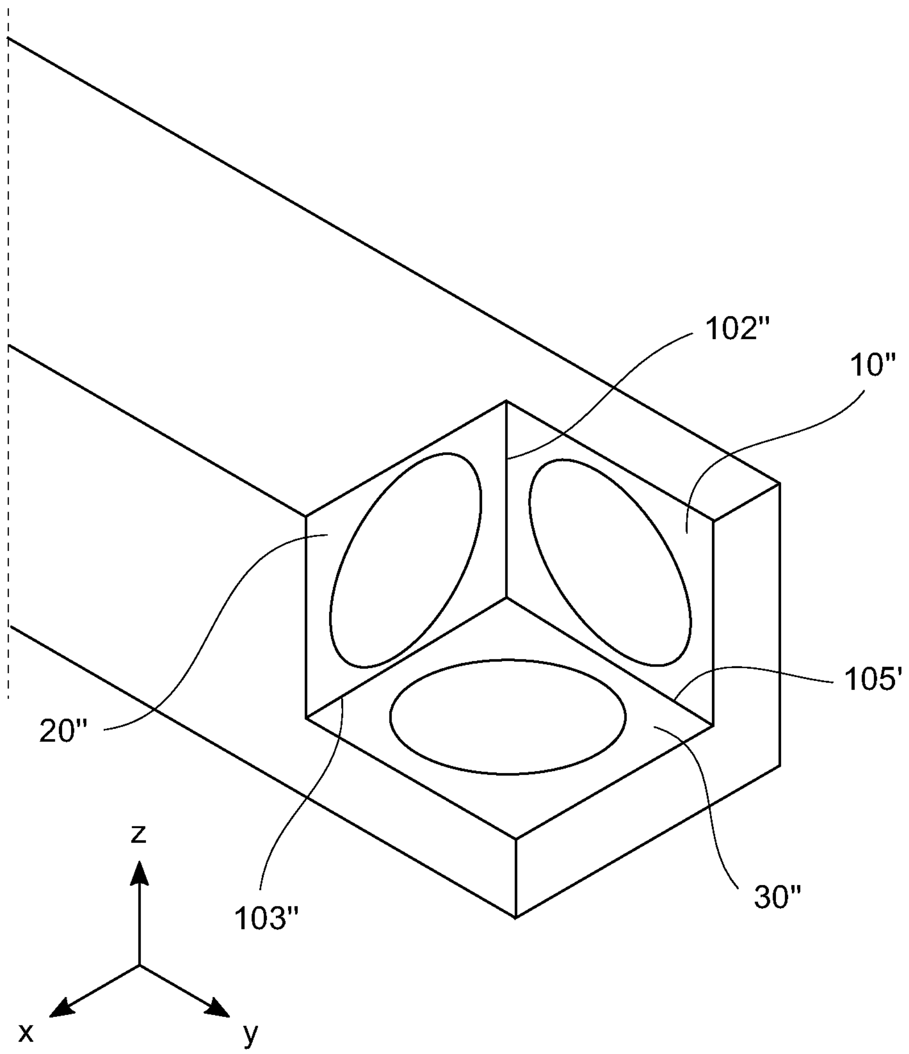
FIG. 9 illustrates a further alternative arrangement for arranging the loudspeaker transducer units in the loudspeaker arrangement.

In FIGS. 7 to 9 are illustrated different physical arrangements of a loudspeaker transducer arrangement according to embodiments of the invention.

In the explanation below the geometrical relationship between the various walls in the loudspeaker arrangement will be explained with reference to the coordinate system indicated in FIGS. 1, 7, 8 and 9. The explanation of the relationship between the various walls is not limiting but intended to indicate the walls' mutual relationship. The exact relative positions of the walls are discussed above and set out in the claims. Consequently, FIGS. 7 to 9 illustrate possible arrangements of the loudspeaker transducer units, within the limitations of the appended claims. When it is stated that a wall is arranged in a plane, it shall be understood that the wall is arranged parallel to the plane or oblique to the mentioned plane, as the slant/tilt/obliquity may be arranged according to the limitations in the claims.

FIG. 7 illustrates an embodiment where the first wall 10 is arranged parallel to the y-z plane. The first wall 10 has a common edge 102 with the second wall 20. The second wall 20 is arranged in a plane parallel to or angled relative to the x-z plane, thereby forming an outward corner with the first wall 10. The second wall 20 is along a further edge 109 parallel to the z-axis, connected with the fourth wall 40. The second wall 20 and the fourth wall 40 along their intersection 109 in the z-axis direction thereby form an inward corner. The third wall 30 is arranged in a plane parallel to or angled relative to the x-y plane and has side edges 103,104 intersecting the second wall 20 and the fourth wall 40 respectively. In this manner the normals L2 and L3 may intersect or cross in the space enveloped by the second, third and fourth walls 20,30,40. The walls 20,30,40 form an inward niche.

In the embodiment illustrated in FIG. 8, the first wall 10' is arranged parallel to the y-z plane. The first wall 10' has a common edge 102' with the second wall 20'. The second wall 20' is arranged in a plane parallel to or angled relative to the x-z plane, thereby forming an outward corner with the first wall 10'. The third wall 30' is arranged in a plane parallel to or angled relative to the x-y plane and has edges 105,103' intersecting the first and second walls 10',20' respectively, such that the first, second and third wall 10',20',30' together form an outward corner. Whereas the three walls 20,30,40 in the embodiment described above with reference to FIG. 7 create a niche into which the second and third loudspeaker transducer units 22,32 emit sound, the embodiment illustrated in FIG. 8, does not have a fourth wall, and does not create a niche two loudspeaker transducer units emit sound into. Rather, sound is emitted from loudspeaker transducer units (not illustrated) in the three walls. The walls 10',20',30' form an outward corner, and there is no fourth wall.

In FIG. 9, the first wall 10" is arranged parallel to the y-z plane. The first wall 10" has a common edge 102" with the second wall 20". The second wall 20" is arranged in a plane parallel to or angled relative to the x-z plane, thereby forming an inward corner with the first wall 10". The third wall 30", has edges 103",105' which are common with the second wall 20" and the first wall 10" respectively, thereby forming an inward corner. In this embodiment the loudspeaker transducer units 12, 22 and 32 with normal L1, L2 and L3 (see FIG. 1) will, when arranged in walls 10", 20" and 30" respectively, all emit sound into the same niche enveloped by the three walls 10",20",30".

A further advantage with the soundbar according to embodiments of the present invention is the fact that as the signal processing units have filters implementing linear transfer functions which are optimized to a desired directivity as illustrated in the FIGS. 6A and 6B the split of the signals as described with reference to FIG. 3 also provides the benefit that loudspeaker transducer units arranged for emitting sound along an axis L will due to the split of the signal also support and enhance the resulting sound emission from other loudspeaker transducer units such that it is made possible to play louder for the entire soundbar than if only one loudspeaker transducer unit was used for the same range.

As should be evident from the description above embodiments of the present invention and its geometrical relationship between the physical arrangement of the loudspeaker transducer units in the various walls arranged in various geometrical relative planes together with the signal processing unit relies on the sound being reflected from surfaces in the ambient environment. It is not necessary to provide special means in the environment in order to obtain this effect as long as the surfaces of the walls and ceilings are able to reflect the sound. In order to adjust the signal processing units correctly and to introduce the correct delays in the emission of sound from the different loudspeaker transducer units an initial measurement at the listening position 62 should be performed in order to calibrate the filters and the signal processing units in order to achieve the desired sound experience at the listening position.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A loudspeaker transducer arrangement, comprising at least three loudspeaker transducers emitting sound in different directions, wherein the loudspeaker transducers are arranged in separate walls, wherein the walls are arranged in separate planes, wherein first, second and third planes are arranged relative to a three-dimensional cartesian coordinate system comprising x, y and z-axis, such that a first wall arranged in the first plane is defined by a normal L1 perpendicular to the first plane and which normal L1 is parallel with the x-axis and a first loudspeaker transducer unit mainly emits sound along the normal L1, a second wall arranged in the second plane is defined by a normal L2 perpendicular to the second plane and which normal L2 results from rotating an axis parallel with the y-axis by an angle θ between 0 and 40 degrees around the z-axis (in the x-y plane) in the direction of the positive x-axis, and a second loudspeaker transducer unit emits sound mainly along the normal L2, and a third wall arranged in the third plane is defined by a normal L3 perpendicular to the third plane and which normal L3 results from rotating an axis parallel with the z-axis by an angle φ between 0 and 20 degrees around the y-axis (in the x-z plane) in the direction of the positive x-axis and subsequently rotating the axis by an angle ρ between −20 and 20 degrees around the x-axis in the direction of the negative y-axis, and a third loudspeaker transducer unit emits sound mainly along the normal L3, wherein at least one loudspeaker transducer unit is arranged in each wall, wherein the first wall in a xyz-coordinate system is arranged in a plane arranged obliquely with respect to the y-z plane or parallel to the y-z plane, wherein the second wall is arranged in a plane arranged obliquely with respect to the x-z plane or parallel to the x-z plane, and wherein the third wall is arranged in a plane arranged obliquely with respect to the x-y plane or parallel to the x-y plane, such that sound emitted along normal L2 will intersect sound emitted along normal L3.

2. The loudspeaker transducer arrangement according to claim 1, wherein the first, second and third loudspeaker transducer units emit sound at different angles away from the z-y plane into a half space defined by the positive x-axis.

3. The loudspeaker transducer arrangement according to claim 1, wherein a fourth wall is provided in a fourth plane, the fourth wall intersecting the second and third walls.

4. The loudspeaker transducer arrangement according to claim 1, wherein the loudspeaker transducer units are of the same type and size.

5. The loudspeaker transducer arrangement according to claim 1, wherein the first, second and third loudspeaker transducer units are arranged in separate acoustic volumes.

6. The loudspeaker transducer arrangement according to claim 1, wherein two or more loudspeaker transducer units are arranged in the first wall and/or the second wall and/or the third wall.

7. The loudspeaker transducer arrangement according to claim 1, wherein a signal for reproduction by the loudspeaker transducer arrangement is fed to the loudspeaker transducer arrangement through a signal processing unit wherein the signal comprises a front signal, a side signal and an up signal, wherein each signal is controlled by a digital control signal processing unit comprising algorithms for controlling the distribution of sound signals to the different loudspeaker transducer units.

8. The loudspeaker transducer arrangement according to claim 1, wherein the first wall in a xyz coordinate system is arranged parallel to the y-z plane, wherein the second wall, sharing a first edge with the first wall, the first edge extending in the z-axis direction, is arranged in a plane arranged obliquely with respect to the x-z plane or parallel to the x-z plane, and wherein, extending from the second wall, the third wall sharing a second edge with the second wall, is arranged in a plane arranged obliquely with respect to the x-y plane or parallel to the x-y plane.

9. The loudspeaker transducer arrangement according to claim 1, wherein the first wall in a xyz-coordinate system is arranged in a plane arranged obliquely with respect to the y-z plane or parallel to the y-z plane, wherein the second wall, sharing a third edge with the first wall, the third edge extending in the z-axis direction, is arranged in a plane arranged obliquely with respect to the x-z plane or parallel to the x-z plane, and wherein the third wall is arranged in a plane arranged obliquely with respect to the x-y plane or parallel to the x-y plane, wherein the third wall shares a fourth edge with the second wall and a fifth edge with the first wall, and wherein the third, fourth and fifth edges form outward corners.

10. The loudspeaker transducer arrangement according to claim 1, wherein the second wall sharing a sixth edge with the first wall, the sixth edge extending in the z-axis direction, wherein the third wall, shares a seventh edge with the second wall, and a eighth edge with the first wall, and wherein the sixth, seventh and eighth edges form inward corners.

11. A soundbar emitting a three dimensional sound image to a listener in a room, the room having a floor, a ceiling, and two sidewalls, wherein the listener is positioned in front of the soundbar, the soundbar having a height, width and a depth, wherein the width is substantially larger than the height and depth, and a longitudinal axis is arranged in the width direction, the longitudinal axis being parallel to a y-axis, and wherein the x-z plane orthogonal to the y-axis is arranged such that the soundbar has plane symmetry on either side of the x-z plane wherein the soundbar in either side comprises the loudspeaker transducer arrangement according to claim 1, and wherein sound emission of each loudspeaker transducer is controlled by digital signal processing.

12. The soundbar according to claim 11, wherein further loudspeaker transducer units may be arranged between the loudspeaker transducer arrangements according to claim larranged in either end of the soundbar.

13. The soundbar according to claim 11, wherein the signal to the transducer arrangement in either side comprises a front signal, a side signal and an up signal, wherein each signal is controlled by a digital control signal processing unit further comprising algorithms for controlling the distribution of sound signals to the different loudspeaker transducer units.

14. The loudspeaker transducer arrangement according to claim 3, wherein one or more loudspeaker transducer units are arranged in the fourth wall.

15. The loudspeaker transducer arrangement according to claim 1, wherein normal L2 intersects normal L3.

* * * * *